United States Patent [19]

Giesing et al.

[11] Patent Number: 4,781,950
[45] Date of Patent: Nov. 1, 1988

[54] METHOD FOR IMPREGNATING MINERAL BUILDING MATERIALS

[75] Inventors: Herbert Giesing; Götz Koerner; Eckehard Schamberg; Jakob Wassermeyer; Christian Weitemeyer, all of Essen, Fed. Rep. of Germany

[73] Assignee: Th. Goldschmidt AG, Essen, Fed. Rep. of Germany

[21] Appl. No.: 79,652

[22] Filed: Jul. 30, 1987

[30] Foreign Application Priority Data

Aug. 9, 1986 [DE] Fed. Rep. of Germany ....... 3627060

[51] Int. Cl.$^4$ .............................................. B05D 1/02
[52] U.S. Cl. .................................... 427/421; 427/136
[58] Field of Search ...................... 427/136, 421, 397.7

[56] References Cited

U.S. PATENT DOCUMENTS 4,716,051 12/1987 Rödder ................. 427/136

Primary Examiner—Bernard D. Pianalto
Attorney, Agent, or Firm—Toren, McGeady & Associates

[57] ABSTRACT

Method for impregnating mineral building materials, with aqueous solutions of silanols and/or siloxanols is disclosed. The solution is obtained by continuous hydrolysis of alkoxysilanes and/or alkoxysiloxanes, of the general formula $$R_a^1 Si(OR^2)_b$$
$$O_{\frac{4-(a+b)}{2}}$$

wherein
$R^1$ = alkyl with 1 to 8 carbon atoms, at least 90% of the $R^1$ groups in the average molecule being alkyl groups with 1 to 4 carbon atoms,
$R^2$ = methyl or ethyl,
$a$ = 0 to 1.5,
$b$ = 1.0 to 4.0,
$a+b$ = 2.0 to 4.0 in an amount corresponding to the expected consumption. The solution obtained is applied on the mineral building material within 3 to 30 minutes after the reactants are mixed. Suitable hydrolysis apparatus is also disclosed.

11 Claims, 3 Drawing Sheets

METHOD FOR IMPREGNATING MINERAL BUILDING MATERIALS

FIELD OF INVENTION

The invention is directed to a method for impregnating mineral building materials, especially masonry, with aqueous solutions of silanols and/or siloxanols, which are produced at the site of their use by hydrolysis of alkoxysilanes and/or alkoxysiloxanes. The invention furthermore is directed to particularly suitable equipment or apparatus for carrying out the method.

BACKGROUND INFORMATION AND PRIOR ART

Silicone impregnating materials are used for the preservation of buildings to reduce the water absorption of mineral building materials. Their high effectiveness is based, on the one hand, on the good spreading capability of the silicones on the free surface of the porous and capillary structure in the building material and, on the other, on the low surface tension of the silicones relative to water. Silicone impregnating materials are therefore used to hydrophobize facades as well as to chemically insulate horizontally against moisture rising in the capillaries of the walls. For both areas of application, the penetrating ability of the impregnating materials used is of decisive importance.

From the extensive patent literature, which relates to the impregnation of mineral building materials with organosilicon compounds, the following representative publications are named, which show different impregnating materials and/or methods for their production.

The European Pat. No. 0,015,366 relates to a method for the preparation of aqueous solutions of alkali organosiliconates, the organo part of which is an alkyl group with 1 to 3 carbon atoms, a vinyl group and/or a phenyl group, while the alkali part is a sodium or potassium ion. The method is characterized in that organopolysiloxanes of the general formula wherein
$R^1$ is alkyl with 1 to 3 carbon atoms, vinyl and/or phenyl,
$R^2$ is alkyl with 1 to 4 carbon atoms,
a is a number $\leq 2$ and
x is 1 to 1.25,
are reacted with aqueous solutions of NaOH or KOH having a concentration of 0.7 to 0.9 moles/100 g at temperatures $\geq 80°$ C., the liberated alcohol $R^2OH$ is distilled off, if necessary, and/or the solution of the reaction product is adjusted to the desired concentration with water.

In this method, in which a filtration step is avoided, alkali chloride-free alkali organosiliconate solutions are obtained, with which mineral materials can be impregnated.

The German Offenlegungsschrift 2,330,887 is directed to the use of alkyl/aryl-alkoxypolysiloxanes of the general formula wherein $R^1$ is alkyl with 1 to 4 carbon atoms, $R^2$ is phenyl and/or methyl, a=0.5 to 1.7, b=0.06 to 2.5 and $4-(a+b)\geq 1$, for impregnating inorganic materials, as well as coal, especially during briquetting.

These compounds are used especially in the form of their solutions in organic solvents such as benzene, toluene or normal commercial aromatic distillates or solvents based on esters or ketones or in the form of aqueous emulsions.

The German Offenlegungsschrift 3,323,908 discloses aqueous emulsions of low molecular weight, alkoxyfunctional silicone resins, which have a long shelf life and contain
(a) 1–60% by weight of silicone resin of the general formula wherein
$R^1$ represents a monovalent hydrocarbon group with 1 to 14 carbon atoms
$R^2$ represents a monovalent hydrocarbon group with 1 to 18 carbon atoms,
x has a value of 0.75 to 1.5 and
y has a value of 0.2 to 2.0, and
and having a viscosity of 2 to 2,000 mPa×sec,
(b) 0.1 to 10% by weight of an emulsifying agent and
(c) water.

The emulsions are used for hydrophobizing mineral materials, the emulsions being said to have a good stability.

In the German Offenlegungsschrift 3,037,220, aqueous solutions of hydrolyzed alkyltrialkoxysilanes, especially propyltrialkoxysilanes, are described, in which the alkoxy group has 1 to 4 carbon atoms. These solutions are said to be relatively stable and to remain clear for several hours, depending on the degree of acidity.

However, these known materials for impregnating mineral building materials show a series of disadvantages, so that a satisfactory solution to the problems of impregnating mineral building materials is not yet known. Essentially the following disadvantages may be observed.

It is true that aqueous solutions of alkali organosiliconates have the required penetrability for mineral building materials; however, curing of the alkali siliconates takes place in the presence of $CO_2$ with formation of alkali carbonate. This curing reaction proceeds slowly and incompletely. The hydrophobizing efect is therefore not very good. Particularly disturbing is the formation of water-soluble salts, which remain in the building material and, under certain conditions, may lead to white coatings on the dry building material surface. Moreover, alkali carbonates may cause salt damage, the building material surface thus occasionally breaking off.

If solutions of low molecular weight silicone resin intermediates or precursors in the aforementioned solvents are used, a high penetration by the solutions into the building materials is admittedly achieved, although at the expense of disadvantages, which occur with the use of an organic solvents. Thus, the odor, flammability and/or the physiological dubiousness of organic solvents are particularly disturbing. These disadvantages are particularly important, when the hydrophobizing of masonry is effected to restore old buildings. The necessary precautionary measures, which must be adhered to when working with organic solvents, moreover keep many potential users from employing such products.

If mineral building materials are impregnated with aqueous emulsions of low molecular weight alkylalkoxysiloxanes, only relatively slight penetration values are achieved. The relatively large droplets of the disperse phase block and clog the pores of the masonry and prevent penetration by the emulsion into the depth of the masonry. The deposition or separation of the siloxane at or near the surface of the building material is, moreover, favored by the fact that the masonry absorbs the continuous phase of the emulsion, so that the emulsion breaks relatively quickly. As a result, the organosilicon phase once again preferentially collects in the region of the surface.

Other difficulties and disadvantages arise if one starts out from alkylalkoxysilanes and at the place where they are to be used, hydrolyzes these in water to the corresponding silanols. This is so, because the silanols, formed in the aqueous solution by the hydrolysis, condense to siloxanols under the conditions of the hydrolysis, for example, at a pH ranging from 3 to 5, low molecular weight, water-soluble siloxanols being formed first. However, the latter condense further with an increase in the size of the molecules if the solution is permitted to stand. The solutions finally become cloudy and, depending on the length of storage, more highly condensed products precipitate from the solutions. From an applications point of view, this is particularly disadvantageous, because one of the factors, on which the hydrophobizing effect depends, is the molecular weight of the hydrolysis products. As a result, the hydrophobizing action of the solution decreases continuously, especially in the case of building materials that are difficult to penetrate, such as clinker, concrete and natural stone with a small pore volume. This deterioration sets in already when the solution is still clear. It is therefore not possible for the user at the construction site to employ an impregnating solution, which always has the same effectiveness. Usually solutions are used on the spot in the amount in which presumably they will be required. The impregnating treatment commences on formation of the clear solution and extends over a period of several hours. Since the condensation reaction proceeds during this period, the hydrophobizing effects deteriorate gradually. As a result, the hydrophobized areas are inhomogeneously hydrophobized, which becomes apparent because of the different extent of the water repellancy. At the same time, it should be taken into consideration that the extent of expertise of the workers involved in the impregnating is generally limited. It is therefore also entirely possible that solutions, which are already slightly cloudy, will be used, since this cloudiness cannot always be recognized in the containers at the building site.

The rate of hydrolysis of the alkoxysilanes and of the low molecular weight alkoxysiloxanes depends on the molecular weight and especially on the nature of the alkoxy groups. If methoxysilanes are used, relatively mild conditions are sufficient to achieve an adequate hydrolysis rate or speed. Under such conditions, the condensation of the silanol/siloxanol mixtures proceeds relatively slowly. However, the release of methanol during the reaction is a disadvantage. If alkoxysilanes or low molecular weight alkoxysiloxanes with ethoxy, propoxy or alkoxy groups with even longer chains are used, the hydrolysis takes longer or the reaction must be catalyzed more strongly. This, however, also leads to an acceleration of the condensation rate. The time span between obtaining a usable, clear, aqueous solution of the silanol/siloxanol mixtures and a no longer usable solution with more highly condensed products becomes small. The usability of the solution on particularly fine-pored building materials may therefore deteriorate already after 30 to 60 minutes.

OBJECTS OF THE INVENTION

It is the primary object of the invention to provide a method, which, even under the rough conditions of the building site operations, makes available to the site operator aqueous solutions of the hydrolysis products of alkoxysilanes and/or low molecular weight alkoxypolysiloxanes of constant quality and properties, to ensure the impregnations of building materials with constant and reproducible quality over an unlimited time period.

It is also an object of the invention to provide suitable apparatus for carrying out the method.

Generally, it is an object of the invention to improve on the art of impregnating mineral building materials.

SUMMARY OF THE INVENTION

Pursuant to the invention, alkoxysilanes and/or alkoxysiloxanes of the general formula wherein
R$^1$ is alkyl with 1 to 8 carbon atoms, at least 90% of the R$^1$ groups in the average molecule being alkyl with 1 to 4 carbon atoms,
R$^2$ is methyl or ethyl,
a=0 to 1.5,
b=1.0 to 4.0 and
a+b=2.0 to 4.0,
are used and continuously hydrolyzed in an amount corresponding to their expected consumption. The solution thus obtained is applied on the mineral building material within a period of 3 to 30 minutes after the reactants are mixed.

The inventive method thus is characterized by the combination of three features.

1. As alkoxysilanes and/or alkoxysiloxanes, the methoxy and ethoxy compounds are selected. The ethoxysilanes and/or ethoxysiloxanes, the hydrolysis of which releases physiologically safe ethanol, are preferred. When methoxy compounds are used, the fact that methanol is split off must be taken into account. However, all the other advantages of the inventive method apply also for the methoxy compounds.

2. Deviating from the state of the art, the aqueous solutions of the hydrolysates are produced continuously. As a result, the impregnating solution is prepared at the same rate at which it is used. This ensures that the solutions for impregnating building materials are available in a constant quality and that thus an impregnation of constant quality is achieved. More particularly, it is avoided that solutions of different degrees of ageing are used. A quality control of the solutions by the operating personnel, which in any event is difficult to carry out, becomes superfluous.

3. The solutions, obtained in a continuous operation, are applied on the mineral building material within the space of 3 to 30 minutes after the alkoxysilanes and/or alkoxysiloxanes are mixed with water.

The use of the above-described alkoxysilanes and alkoxysiloxanes in association with carrying out the hydrolysis at a pH ranging from 3 to 5, optionally and preferably after the addition of known catalysts, ensures that the hydrolysis reaction is completed within the given period of time and that a clear solution is produced. Moreover, within this time period higher molecular weight condensation products have not yet been formed in significant amounts and to an extent or at which they interfere with the hydrophobization.

In the organosilicon compound of formula I, $R^1$ preferably is methyl. If alkoxysiloxanes of formula I or mixtures of alkoxysilanes of formula I are used, up to 10% of the $R^1$ groups may have 5 to 8 carbon atoms. It is known that such $R^1$ groups can modify the impregnating effect in a desired manner. The subscript a has a value of 0 to 1.5 and preferably of 0 to 1.0. The subscript b has a value of 1.0 to 4.0 and preferably of 3.0 to 4.0. The sum of the numerical values a and b is 2.0 to 4.0 and preferably 3.5 to 4.0. If the sum of the numerical values $a+b=4$, uncondensed monomeric compounds are present. If the value of $a=1.0$, alkylalkoxysilanes are present; if the value of $a=0$, alkylsilicate esters are concerned. Those skilled in the art will understand that formula I represents not only individual compounds, but also mixtures of compounds, in which case the subscripts a and b refer to the average molecule.

The use of compounds of the formula is especially preferred. An example of a particularly preferred ethoxysilane is

Other suitable, hydrolyzable silanes or siloxanes are

-continued

For physiological reasons, tetraethoxysilane (ethylsilicate ester) is especially preferred. It is also possible to cohydrolyze mixtures of alkylalkoxysilanes and/or alkylalkoxysiloxanes with optionally partially condensed silicate esters, that is, compounds of formula I, in which $a=0$. By these means, the effectiveness of the impregnating solution is improved in some cases, which depend on the building material. The hydrophobizing is then brought about by the alkylalkoxysilanes and/or alkylalkoxysiloxanes, while the silicate esters have a consolidating effect on the surface of the impregnated building material.

The catalysis is accomplished in a known manner with mineral acids, such as hydrochloric acid, organic carboxylic acids, such as formic acid, and sulfonic acids, such as alkylbenzenesulfonic acids, especially dodecylbenzenesulfonic acid. The acids may be added in liquid form to the hydrolyzing alkylalkoxysilanes and/or alkylalkoxysiloxanes in known concentrations of 0.1 to 1% by weight. In the alternative, the acids may be fixed on solid support substances as solid-bed catalysts, which are obtainable in large numbers on the market.

A preferred embodiment of the inventive method resides in that the continuous hydrolysis is carried out in several steps and that a partial amount of the hydrolysis product of a higher step may be returned to a lower step. In this context, a multistep hydrolysis is understood to be a reaction, which is conducted by first mixing the product to be hydrolyzed with only a portion of the water required for complete hydrolysis. A second or the remaining portion of the water is added to the reaction product only after the partial hydrolysis has been completed. In a multistep procedure, portions of the second step may be returned to the first step. A higher process rate is achieved with this preferred procedure.

Preferably the time that elapses between mixing the reactants and applying the product on the building material is 5 to 20 minutes and especially 5 to 15 minutes.

An excess amount of water is applied to the hydrolysis reaction so that the ultimate solution contains about 2–20 percent by weight of hydrolysis product. In a preferred embodiment the amount of water is chosen so that the solution contains 5 to 15% by weight of hydrolysis product. Excellent results are obtained with impregnating solutions containing 5–10% by weight of hydrolysate.

Apparatus with different structural configurations is possible for carrying out the hydrolysis and delivering the hydrolysate continuously.

DESCRIPTION OF THE DRAWINGS

Embodiments of apparatus suitable for carrying out the inventive hydrolysis method are shown in the accompanying drawing wherein.

The inventive apparatus is constructed so as to be portable at the building site and is advantageously mounted for this purpose on a moveable platform (not shown).

The apparatus includes a reactor 1, which is constructed as a vertically disposed mixing reactor containing several superimposed chambers 5. It will be noted that the reactor 1 shown in FIG. 1 comprises five mixing chambers 5, which are separated from one another by perforated plates or bottom members 4 with mutually offset flow passages 46, 47. It should be appreciated, that a larger number of chambers 5 may be arranged; however, generally it is sufficient to provide five mixing or reaction chambers 5. The contents of the reactor 1 are mixed by agitating means or stirrer 2, mixing members or paddles 3 being provided in the individual chambers 5. The reactor has a vent 30 in its head or top region, the reaction materials flowing through the reactor from the bottom towards the top.

Figure 1:
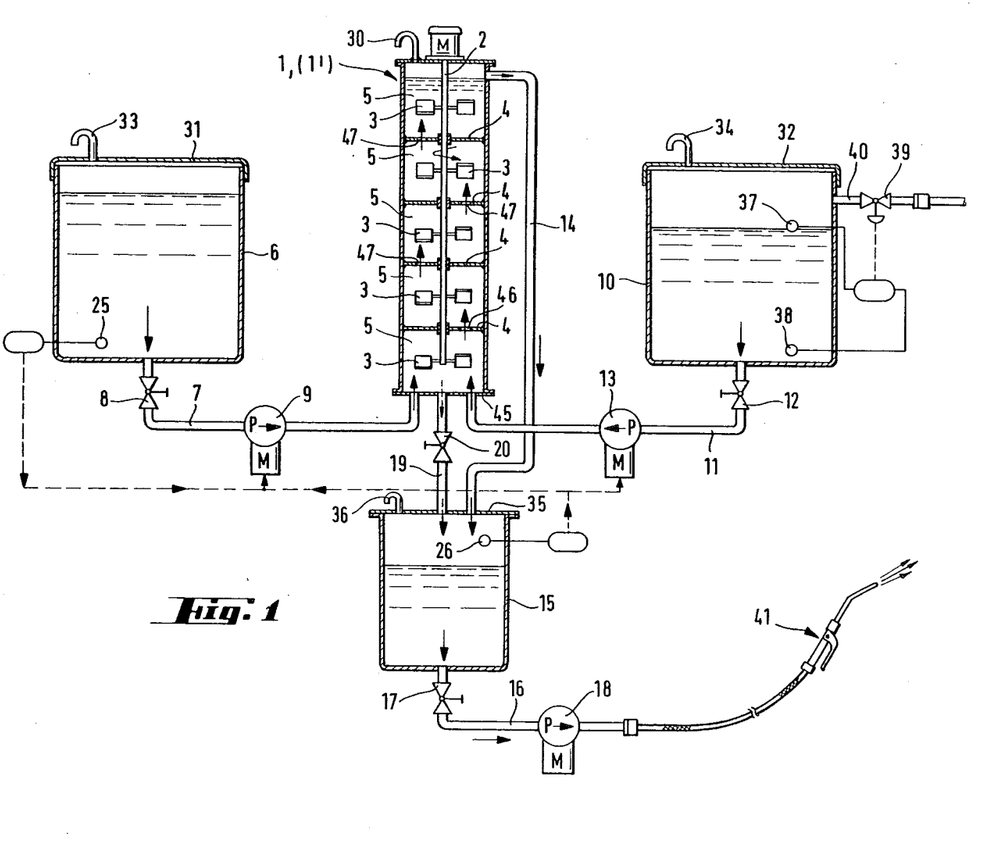
FIG. 1 is a somewhat diagrammatical view in block-diagram fashion of the entire arrangement including a reactor for carrying out the hydrolysis.

As will be seen in FIG. 1, the arrangement comprises two reservoirs or storage containers 6 and 10, each being covered by a lid or cover 31 and 32, respectively. Aerating and venting devices 33 and 34 are arranged in the lids 31 and 32. Storage container 6 is filled with the alkoxysilane/alkoxysiloxane or with a mixture of the organosilicon compounds. By contrast, the storage container 10 contains the water required for the hydrolysis. The two storage containers or reservoirs 6 and 10 are connected with the reactor 1 through lines 7 and 11, respectively. The lines 7 and 11 open up and discharge into the bottom or base of the reactor 1 and each have a valve 8 and 12, respectively, connected in the line. A metering pump 9 is provided for delivering metered amounts of the alkoxysilanes or alkoxysiloxanes to be hydrolyzed. The water required for the hydrolysis is fed by means of the metering pump 13 into the bottom space of the reactor 1. The hydrolysis product is drawn off from the head portion of the reactor 1 through line 14 and discharged into storage container or reservoir 15. The storage container 15 is covered by the lid 35, which is provided with an aerating and venting arrangement 36. The volume of the reactor 1 and of the storage container 15 is about the same. The hydrolysis product is fed through line 16 from the storage container 15 to the place of use. This is done by means of pump 18 and spraying lance 41. The line 16 may be closed by valve 17.

If the hydrolysis is to be terminated or interrupted, the reactor 1 can be emptied through line 19 into the storage container 15, the valve 20 then being in the open condition. The storage container 6, which is to contain the compound to be hydrolyzed, has a level-dependent signal transmitter 25. This signal transmitter 25 controls the metering pumps 9 and 13. If the liquid level falls below a certain value, the metering pumps 9 and 13 are then shut off by the signal transmitter 25. Collecting vessel 15 for storing the hydrolysis solution has a level-dependent contactor 26. If the prepared solution exceeds the adjusted level in the container 15, the metering pumps 9 and 13 are switched off.

The water container 10 has an upper contactor 37 and a lower contactor 38, which open and close, respectively, the valve 39 of the water supply line 40, the latter being connected to the communal water supply. The mode of operation of the described apparatus pursuant to FIG. 1 is as follows:

Silane/siloxane is supplied to container 6. The water supply container 10 is connected to a water supply and filled with water through pipeline 40. When the level of the water has reached the maximum upper contact member 37, the latter causes switching off of the water supply by closing valve 39. Upon opening of the valves 8 and 12, the metering pumps 9 and 13 are ready to operate. They can be switched on together and pump preadjusted amounts into the lowermost chamber 5 of the reactor 1. Intense mixing of the reaction components takes place in the first and second mixing or reaction chambers 5. This is accomplished by the stirring elements 3 and causes commencement of the hydrolysis, which proceeds to a considerable extent. The purpose of the third through fifth chambers 5 is to effect the post-hydrolysis. The hydrolysis product enters the collecting container 15 through overflow 14, which connects the top of the reactor 1 with the vessel 15. The hydrolysis product is then fed from the container 15 by the pump 18 and through the spraying lance 41 to the place of use, the valve 17 being in open condition.

If the application of the solution is interrupted or the need for the solution is reduced from time to time, the solution of the hydrolysis product contained in the container 15 can be stored therein. In other words, collecting vessel or container 15 serves two purposes. It thus functions as a delivery container and also as an interim storage vessel.

Pumps 9 and 13 are switched off when the maximum permitted level has been reached, to wit, if the solution contacts the upper contactor 26, which causes the shut-off of the pumps 9 and 13. This in turn causes interruption of the hydrolysis. In the further processing, the supply of solution contained in the vessel 15 is first used up before the hydrolysis is again started up by switching on the pumps 9 and 13. If the amount of silane/siloxane product in the container 6 falls to such a low level that it clears the minimum contactor 25, the pumps 9 and 13 are automatically switched off. The hydrolysis can then be continued only after the silane/siloxane supply container 6 has been filled up to above the level of contactor 25.

The water supply container 10, once the water amount has fallen to the level of the lower contact 38, is automatically filled with fresh water by opening the valve 39. The water then flows into the container 10 until it reaches the upper contactor or level 37.

The entire arrangement operates without excess pressure and venting and aerating are accomplished by the devices 30, 33, 34 and 36.

In order to work up residual amounts contained in the reactor 1 at the end of the procedure, the pumps 9 and 13 are shut off and the valves 8 and 12 are closed, whereupon the content of the reactor is emptied into the container 15 by opening the valve 20. The processing of the residual amount of the solution of hydrolysis product is then processed in the manner described above.

Figure 2:
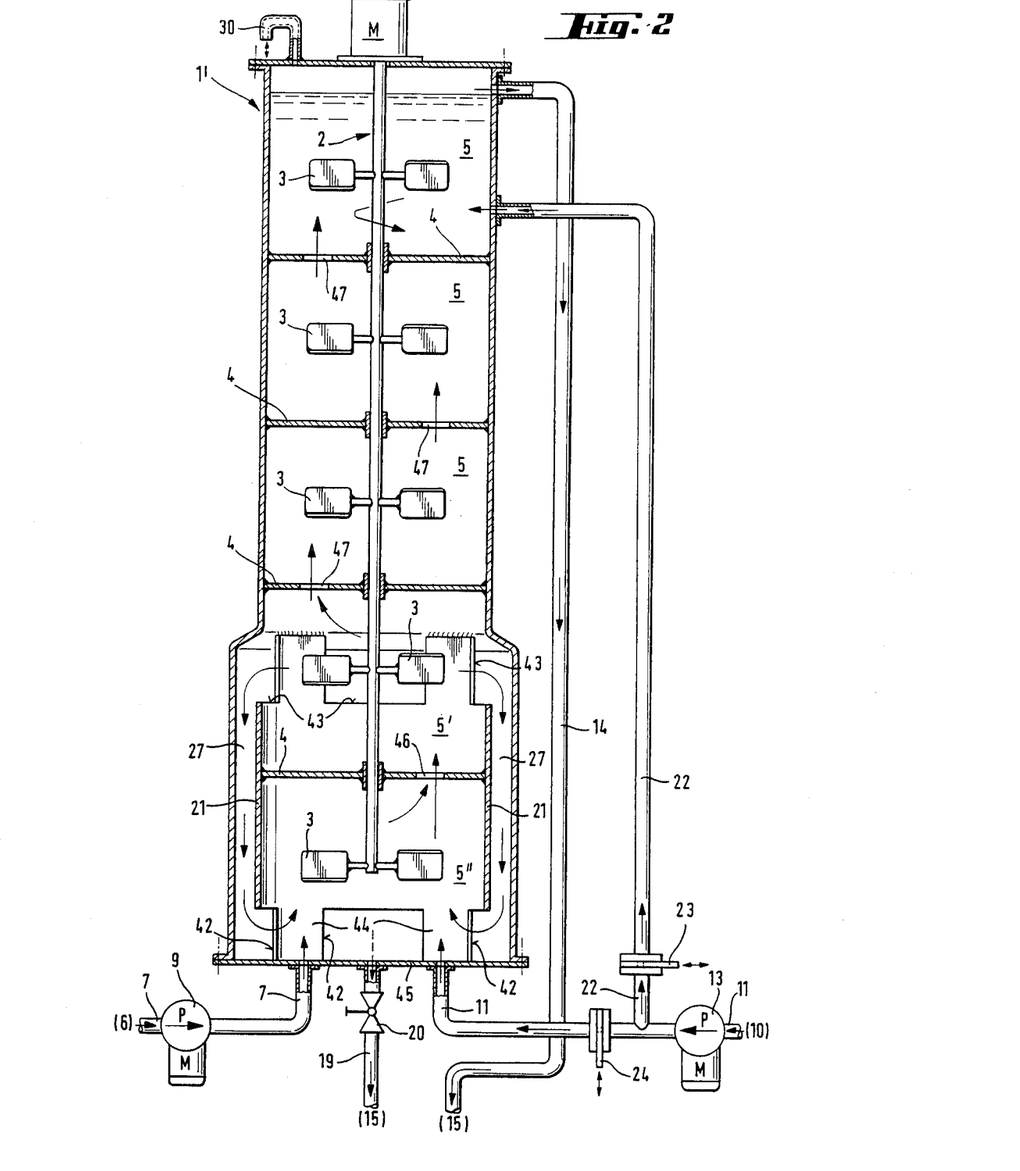
FIG. 2 shows a preferred embodiment of a reactor for the continuous hydrolysis and FIGS. 3 and 4 are side and front views, respectively, for an arrangement for measuring the water absorption capacity.

FIG. 2 illustrates a particularly advantageous embodiment of the hydrolysis reactor. Turning now to FIG. 2, the reactor 1', as in reactor 1, comprises a stirring or agitating means 2 with stirring members 3 attached thereto. Individual plates or bottom members 4 with flow passages 46 and 47 are provided between and form a boundary of the reaction or mixing chambers 5, 5' and 5". Pipeline 7, which carries the silane/siloxane, discharges into the bottom portion of the reactor 1', a metering pump 9 being connected in the line. Line 11, for the supply of water, also discharges into the lower portion of the reactor, a metering pump 13 being arranged in the line. So far the embodiment corresponds to that of FIG. 1. However, the reactor 1' of FIG. 2 has two features, which are absent in the reactor of FIG. 1.

The first feature is that the two lower mixing or reaction chambers 5' and 5" are of double-wall construction with the formation of an annular chamber 27, which is common to both chambers 5' and 5". The inner wall 21 of the annular chamber 27 has flow passages in the bottom region of the chamber 5" and in the middle region of chamber 5'. These flow passages are formed by openings or break-throughs 42 and 43. In the embodiment here shown, the annular chamber is formed thereby that the cross section of the reactor 1' expands or becomes wider in the region of the chambers 5' and 5" and the tubular inner wall 21 is disposed in such a manner, that a portion of the liquid in the upper region of chamber 5' can enter the annular chamber while the liquid, in the lower region of the chamber 5", can exit from the annular chamber. The tubular inner wall 21 is secured at the reactor bottom 45 by means of web members 44.

The second feature of the embodiment of FIG. 2 is that a portion of the water required for the hydrolysis is branched off from line 11 and is fed through the line 22 into the first or top chamber 5 of the reactor 1'. Flow controllers 23 and 24 are provided to adjust the amounts of water, which are to be fed into the bottom region and the region of the top chamber 5 of the reactor 1' respectively. In this manner it is feasible to carry out the continuous hydrolysis in two stages.

In carrying out the inventive method in the apparatus described in FIG. 2, the silane or siloxane and a portion of the water are fed through lines 7 and 11 into the bottom region of the reactor 1' and more particularly into the chamber 5". There, partial hydrolysis takes place. The reaction product enters through the opening 46 into the chamber 5'. A portion of the solution is again fed to the bottom region of the chamber 5". This is accomplished by the stirring members 3 of the agitating means 2, the portion of the solution entering the chamber 5" through the annular chamber 27. In this manner, the phase compatibility of the reaction medium with the silane or siloxane is improved and the rate of the hydrolysis of the silane or siloxane is increased. The residual amount of the product formed primarily in the chambers 5" and 5' enters through the opening 47 into the top chambers 5. The reaction mixture is there supplied with the residual amount of water necessary for the hydrolysis through line 22. The hydrolysis reaction of the remaining alkoxy groups now takes place in the three top chamber 5. The hydrolyzed solution flows through line 14 into the collecting vessel 15.

It will be appreciated that the preferred embodiment of the reactor 1' as shown in FIG. 2 renders it possible partially to recirculate the product, this being accomplished by the radial feed or transporting action of the stirring member 3 and the provision of the annular chamber 27. The amount of recirculated product is a function of the radial feed action of the stirring members and the flow cross section of the annular chamber.

The following examples describes the performance of the inventive procedure indicating specific components and amounts, the method being carried out in the reactor of FIG. 2. It should be understood, however, that this example is given by way of illustration and not by way of limitation and that many changes may be affected both in the method conditions and the construction of the apparatus without departing in any way from the scope and spirit of the invention.

It follows that equipment for carrying out the inventive process is characterized by a cylindrical reactor 1 or 1' with stirrer 2 and stirring organs or members 3. The reactor is subdivided by horizontal partitions 4 with mutually offset flow passages 46, 47 into a plurality of mixing or reaction chambers 5. A reservoir 6 for the alkoxysilane or alkoxysiloxane to be hydrolyzed is provided, which is connected over pipeline 7 with the reactor 1 or 1', a valve 8 and a metering pump 9 being disposed in the pipeline 7. A reservoir 10 for the water required for the hydrolysis is provided, which is connected over pipeline 11 with the reactor 1 or 1', a valve 12 and a metering pump 13 being disposed in pipeline 11, and pipelines 7 and 11 discharging into the bottom region of reactor 1 or 1'. A take-off line 14 for the hydrolysate is arranged, which is disposed in the head region of the reactor 1 or 1'.

Preferably, the equipment has a reservoir 15 for the hydrolysis product with a discharge line 16, in which a valve 17 and a feed pump 18 are disposed, pipeline 14 discharging into reservoir 15 and a pipeline 19 with valve 20 for emptying the reactor 1 or 1' extending from the base of the reactor to the reservoir 15.

The reactor 1 or 1' may also have more than five mixing or reaction chambers. The capacity of reactor 1 or 1' advantageously corresponds to the capacity of the intermediate storage vessel 15.

For the stepwise hydrolysis with return of a portion of a partially hydrolyzed product, a reactor 1' like that shown in FIG. 2 is suitable. In this reactor, the two lower chambers 5' and 5" are of double-wall construction with the formation of an annular chamber 27 common to the two chambers, and the interior wall 21 is penetrated in the bottom region of chamber 5" and in the middle or head region of chamber 5' at 42 and 43, there being disposed in pipeline 11 a feed pump 13. A branch for a pipeline 22 with flow regulator 23 is provided, which discharges into the top mixing or reaction chamber 5 and, between the branch to the pipeline 22 and the reactor 1', a flow regulator 24 is arranged.

Preferably, level-dependent signal transmitters for turning the metering pumps on and off are disposed in the vessels 6 and 15.

EXAMPLE

A mixture of 80 parts by weight of methyltriethoxysilane, 20 parts by weight of propyltriethoxysilane and 0.4 parts by weight of dodecylbenzenesulfonic acid is supplied through pipeline 7 to the reactor 1'. The reactor comprises five mixing and reaction chambers 5, 5' and 5". The flow rate of the mixture is 10 L/hour. Tap water, also at a flow rate of 10 L/hour, is supplied over the flow regulator 24 to the mixing and reaction chamber 5″. The capacity of the mixing and reaction chamber 5″ is 0.5 L, so that the average residence time of the silane/water mixture in the mixing and reaction chamber 5″ is 1.5 minutes. The average residence time of the silane/water mixture in the mixing and reaction chamber 5′ also is 1.5 minutes, because this mixing and reaction chamber also has a volume of 0.5 L. Due to the double-wall construction of the chambers 5′ and 5″, a portion of the stream of hydrolysis mixture is returned through the break-throughs 43 from the chamber 5′ and through the break-throughs 42 into the lower chamber 5″. As it leaves the chamber 5′ through the perforated horizontal partition 4 and enters the chamber 5 there above, the hydrolysis mixture already is free of cloudiness. The hydrolysate, as it reacts further, now flows through the three chambers 5. Tap water is supplied at a flow rate of 30 L/hour over branch line 22 to the top chamber 5, and dilutes the hydrolysis mixture there. The mixture flows out through discharge line 14 and is applied with a spray lance 41 to a lime sandstone facade of a building. The liberated alcohol can escape through the aeration and ventilation device 30.

The facade is flooded with impregnating material until it is saturated and no longer absorbs further impregnating material. The consumption is of the order of 1.5 L/m².

Figure 3:
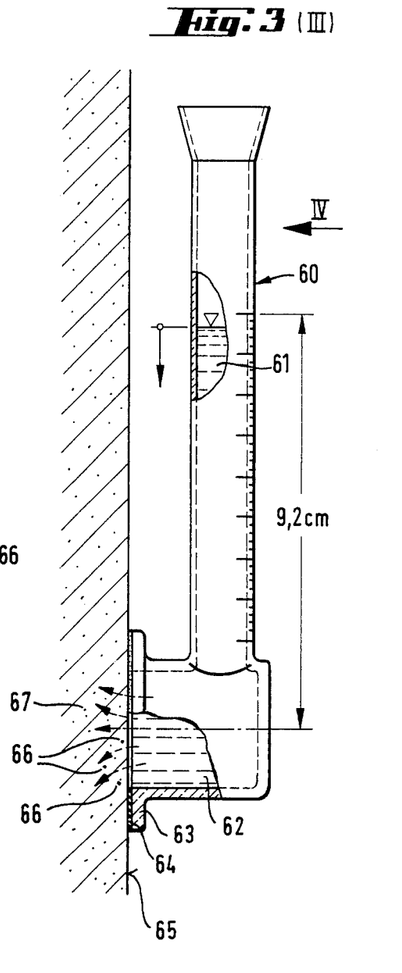
Figure 4:
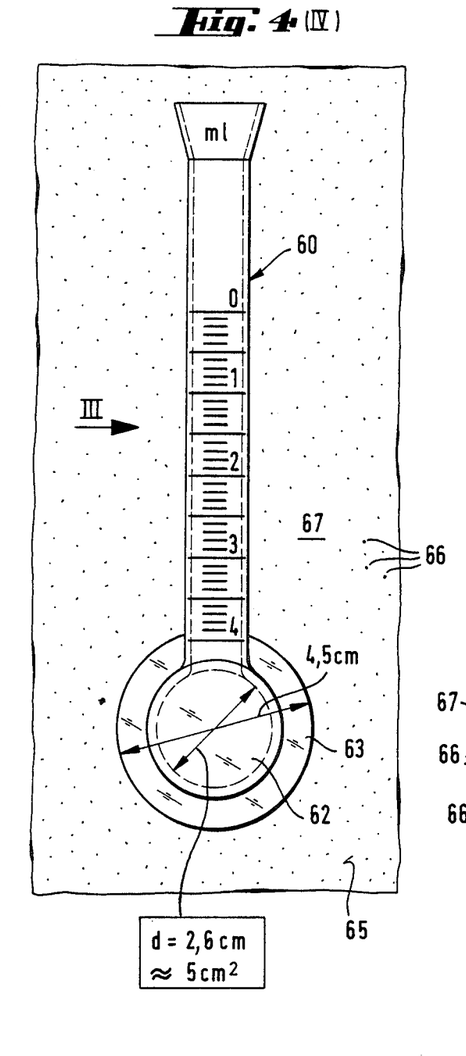

Measurement of the degree of water absorption achieved by the impregnation is made two weeks after the facade treatment. This is done with the help of a Karstens test tube, which is shown in side view in FIG. 3 and in front view in FIG. 4. The test tube 60 has a container 62 with flange 63 in the base region. The tube is attached by means of a thermoplastic sealing composition 64 to the wall surface 65 of the masonry 67 having pores 66. The test tube 60 is filled with water to the zero mark of the calibration. As soon as the 4 mark is reached, the test tube 60 is topped up once again to the zero mark. The water consumed is recorded after 5, 10 and 15 minutes.

From the water absorbed by the test surface within 10 minutes (water absorption after 15 minutes minus water absorption after 5 minutes), the degree of water absorption in kg/m² is calculated. The test results in the Table below show that the facade, which has not been impregnated, absorbs 10 kg of water per m² of facade surface in 10 minutes, while the impregnated facade absorbs practically no water and is thus effectively hydrophobized.

TABLE

| Water Absorption and Degree of Water Absorption of a Lime Sand Brick Facade | | | |
|---|---|---|---|
| Water Absorption [mL] after | | | Degree of Water Absorption [kg × m⁻²] |
| 5′ | 10′ | 15′ | |
| untreated | 2.0 | 4.2 | 6.6 | 9.2 |
| impregnated | 0 | 0 | 0 | 0 |

We claim:

1. A method of impregnating mineral building material, such as masonry, at a predetermined site with aqueous solution of silanol and/or siloxanol which comprises
   (a) continuously hydrolyzing at said site alkoxysilane and/or alkoxysiloxane compounds of the general formula wherein
R¹ is alkyl with 1 to 8 carbon atoms, at least 90% of the R¹ groups in the average molecule being alkyl with 1 to 4 carbon atoms,
R² is methyl or ethyl,
a=0 to 1.5,
b=1.0 to 4.0 and
a+b=2.0 to 4.0,
by mixing water with said compounds, said hydrolysis being carried out with amounts of water and said compounds so as to obtain an amount of hydrolysate solution, which is used for impregnating purpose within a period not exceeding about 30 minutes, and
   (b) applying the solution of (a) to building material at said site within a time span of 3–30 minutes after the water and said compounds have been mixed.

2. The method of claim 1, wherein the continuous hydrolysis is carried out in a plurality of communicating reaction zones, less than the total amount of water required for the hydrolysis being initially mixed with said compounds in the first of the reaction zones, the remainder of the required water being added to the hydrolysis product in another one of said reaction zones.

3. The method of claim 2, wherein the reaction zones are arranged one above the other, a portion of hydrolysis product obtained in a higher reaction zone being returned to a lower reaction zone.

4. The method of claims 1 or 2, wherein said compounds have the general formula

5. The method of claims 1 or 2, wherein said compounds have the general formula

6. The method of claim 5 wherein CH₃Si(OC₂H₅)₃ is used as ethoxysilane.

7. The method as claimed in claims 1 or 2, wherein the solution of (a) is applied on the mineral building material within a period of 5 to 20 minutes after the reactants are mixed.

8. The method of claims 1 or 2, wherein the hydrolysis is carried out in the pH range of 3–5 and in the presence of a catalyst.

9. The method of claims 1 or 2, wherein
a=0 to 1.0
b=3.0 to 4.0 and
a+b=3.5 to 4.0.

10. The method of claims 1 or 2, wherein the amount of water mixed with said compounds is in excess to that required for the hydrolysis, the said excess being such that the ultimate solution contains about 2–20 percent by weight of hydrolysate.

11. The method of claims 1 or 2, wherein said compounds are selected from the group consisting of wherein n = 0 to 5, wherein m = 1 or 2, and and wherein p' = 0 to 5.

* * * * *